(12) United States Patent
Aiba et al.

(10) Patent No.: US 12,381,256 B2
(45) Date of Patent: Aug. 5, 2025

(54) PRODUCTION METHOD OF NON-AQUEOUS ELECTROLYTE SOLUTION

(71) Applicant: ORGANO CORPORATION, Tokyo (JP)

(72) Inventors: Kenta Aiba, Tokyo (JP); Akira Nakamura, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 739 days.

(21) Appl. No.: 17/766,830

(22) PCT Filed: Oct. 9, 2020

(86) PCT No.: PCT/JP2020/038320
§ 371 (c)(1),
(2) Date: Apr. 6, 2022

(87) PCT Pub. No.: WO2021/090640
PCT Pub. Date: May 14, 2021

(65) Prior Publication Data
US 2023/0052583 A1 Feb. 16, 2023

(30) Foreign Application Priority Data

Nov. 7, 2019 (JP) .................................. 2019-202282

(51) Int. Cl.
*H01M 10/0566* (2010.01)
*B01D 15/36* (2006.01)

(52) U.S. Cl.
CPC ...... *H01M 10/0566* (2013.01); *B01D 15/363* (2013.01); *H01M 2300/0025* (2013.01)

(58) Field of Classification Search
CPC ..... H01M 10/0566; H01M 2300/0025; H01M 10/0525; H01M 10/054; H01M 10/0569;
(Continued)

(56) References Cited

FOREIGN PATENT DOCUMENTS

| EP | 3 919 170 A1 | 12/2021 |
|---|---|---|
| JP | H7-235310 A | 9/1995 |

(Continued)

OTHER PUBLICATIONS

JP2013229571 Kimura et al.—Electrolyte injection method and apparatus (Nov. 7, 2013; pages) (Year: 2013).*

(Continued)

*Primary Examiner* — Hayden Brewster
(74) *Attorney, Agent, or Firm* — Greenblum & Bernstein, P.L.C.

(57) ABSTRACT

Provided is a production apparatus of a non-aqueous electrolyte solution that can produce conveniently and at a low cost the non-aqueous electrolyte solution while readily controlling an acidic impurity concentration so as to be in a prescribed level. The production apparatus of the non-aqueous electrolyte solution includes an original liquid tank that stores a liquid to be processed containing a non-aqueous electrolyte solution, and an ion-exchange resin container that accommodates a weakly basic anion-exchange resin, and also including a liquid circulation pipe that returns the liquid to be processed that is obtained after flowing the liquid to be processed from the original liquid tank through the ion-exchange resin container to the original liquid tank.

2 Claims, 4 Drawing Sheets

(58) Field of Classification Search
CPC ........... H01M 10/052; H01M 10/0568; H01M 2300/0037; B01D 15/363; B01D 15/1814; B01D 15/00; Y02E 60/10; Y02P 70/50; B01J 20/18; B01J 41/07; B01J 41/14; B01J 47/02; H01G 11/58; H01G 11/84
USPC .......................................................... 210/660
See application file for complete search history.

(56) References Cited

FOREIGN PATENT DOCUMENTS

| | | |
|---|---|---|
| JP | H11-185810 A | 7/1999 |
| JP | 2010-153234 A | 7/2010 |
| JP | 2011-71111 A | 4/2011 |
| JP | 2013-229571 A | 11/2013 |
| JP | 2015-185235 A | 10/2015 |
| JP | 2019-053980 A | 4/2019 |
| WO | 98/23536 A1 | 6/1998 |
| WO | 2019/054220 A1 | 3/2019 |

OTHER PUBLICATIONS

JPH11185810 Furukawa et al.—Electrolyte for lithium battery (Jul. 9, 1999; 3 pages) (Year: 1999).*
ISR for PCT/JP2020/038320, dated Dec. 15, 2020.
Office Action issued Jul. 4, 2023 in Chinese family member application No. 202080069197.8, and English language translation thereof.
Office Action issued Dec. 9, 2023 in Chinese family member application No. 202080069197.8 with English language translation thereof.
Extended European Search Report issued Dec. 14, 2023 in European family member application No. 20885650.0.

* cited by examiner

PRODUCTION METHOD OF NON-AQUEOUS ELECTROLYTE SOLUTION

TECHNICAL FIELD

The present invention relates to a production apparatus of a non-aqueous electrolyte solution and to a production method of a non-aqueous electrolyte solution.

BACKGROUND ART

In the lithium-ion battery, a non-aqueous electrolyte solution in which a lithium-based electrolyte such as lithium hexafluorophosphate ($LiPF_6$) is dissolved in an organic non-aqueous solvent is used.

However, a small amount of water remains in the solvent that constitutes the electrolyte solution and in the lithium-based electrolyte; and this water reacts with the lithium-based electrolyte such as $LiPF_6$ mentioned above to produce hydrogen fluoride (HF) and the like, for example, as indicated in the following reaction formulae (1) to (3).

$$LiPF_6 \rightleftarrows LiF + PF_5 \quad (1)$$

$$PF_5 + H_2O \rightarrow POF_3 + 2HF \quad (2)$$

$$POF_3 + H_2O \rightarrow POF_2(OH) + HF \quad (3)$$

When acidic impurities such as hydrogen fluoride are present in the electrolyte solution, the battery capacity of the lithium-ion battery and the cycle characteristics of charging and discharging are deteriorated, and corrosion inside the battery readily occurs (see Patent Literature 1 (Japanese Patent Publication 2011-71111-A) etc.

CITATION LIST

Patent Literature

Patent Literature 1: Japanese Patent Publication 2011-71111-A

SUMMARY

Technical Problem

Figure 4:
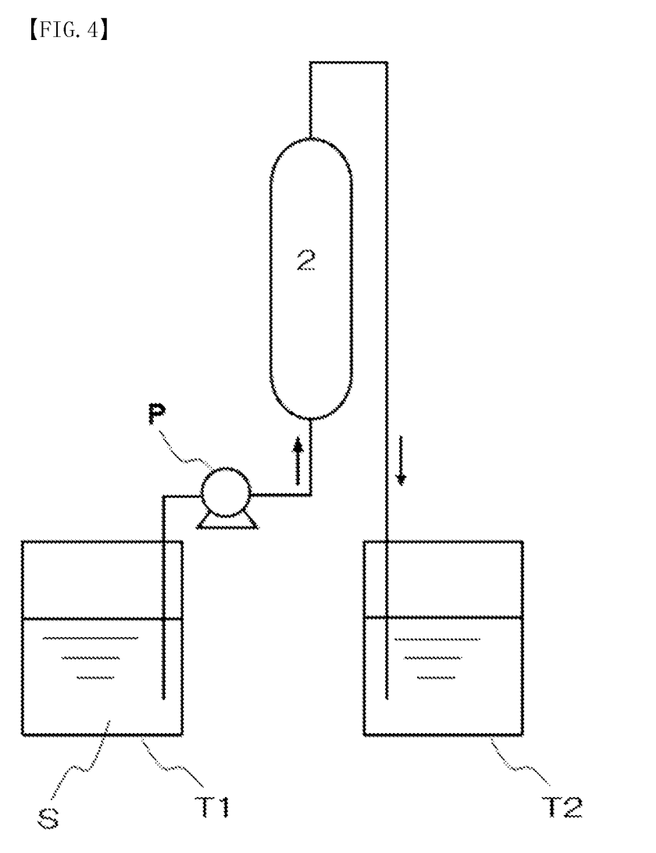
FIG. 4 is a schematic diagram illustrating a comparative embodiment example of the production apparatus of the non-aqueous electrolyte solution.

Because of this, a method for removing acidic impurities from the electrolyte solution has been wanted; and the target non-aqueous electrolyte solution is produced, for example, by the method as illustrated in FIG. 4, in which after a liquid to be processed (unprocessed non-aqueous electrolyte solution) S is flowed from an original liquid tank T1 through a column 2 that is packed with an ion-exchange resin thereby removing the acidic impurities such as hydrogen fluoride contained in the liquid, the processed solution (non-aqueous electrolyte solution) that is flowed out of the column 2 is stored in a storage tank T2.

According to the conventional method as described above, immediately after the start of processing of the liquid to be processed S, the processed solution (non-aqueous electrolyte solution) having the acidic impurity concentration lowered most is obtained; however, as the ion-exchange ability decreases with passage of time, the acidic impurity concentration in the processed solution increases. After exceeding a certain point, the acidic impurity concentration in the processed solution becomes more than a prescribed value.

In this case, for example, in the production apparatus of the non-aqueous electrolyte solution illustrated in FIG. 4, all the processed solution having the acidic impurity concentration decreased most and the processed solution having the acidic impurity concentration increased are stored in the storage tank T2, and as a result, the acidic impurity concentration in the processed solution that is stored in the storage tank T2 gradually increases with the passage of processing.

Because of this, according to the conventional method described above, even if the acidic impurity concentration in the processed solution thereby obtained was the prescribed value or less, the acidic impurity concentration in the processed solution obtained after a certain time from the start of flowing through the ion-exchange resin changed from the acidic impurity concentration in the processed solution obtained immediately after the start of flowing, so that the processed solution (non-aqueous electrolyte solution) having a constant quality was difficult to be obtained.

In addition, according to the conventional method described above, it was necessary to always replace the ion-exchange resin when the acidic impurity concentration in the processed solution (non-aqueous electrolyte solution) became more than the prescribed value; thus, when the non-aqueous electrolyte solution was industrially produced, not only the operation was cumbersome but also it was prone to increase the production cost thereof.

Under such circumstances, the present invention is intended to provide the production apparatus of the non-aqueous electrolyte solution and the production method of the non-aqueous electrolyte solution with which the non-aqueous electrolyte solution can be produced conveniently and at a low cost with easily controlling the acidic impurity concentration so as to be in a prescribed level regardless of whether the ion-exchange ability of the ion-exchange resin is decreased.

The inventors of the present invention have carried out an extensive investigation to achieve the above object and have found that the above technological problem could be solved by the production apparatus of the non-aqueous electrolyte solution, the production apparatus including an original liquid tank that stores a liquid to be processed containing a non-aqueous electrolyte solution, and an ion-exchange resin container that accommodates a weakly basic anion-exchange resin, and also including a liquid circulation pipe that returns a processed solution that is obtained after flowing the liquid to be processed from the original liquid tank through the ion-exchange resin container (the liquid to be processed that has flowed therethrough) to the original liquid tank. The present invention could be achieved on the basis of this finding.

Namely, the present invention provides the following.
(1) A production apparatus of a non-aqueous electrolyte solution, the production apparatus including
an original liquid tank that stores a liquid to be processed containing a non-aqueous electrolyte solution, and an ion-exchange resin container that accommodates a weakly basic anion-exchange resin, and also including
a liquid circulation pipe that returns the liquid to be processed that is obtained after flowing the liquid to be processed from the original liquid tank through the ion-exchange resin container to the original liquid tank.
(2) The production apparatus of the non-aqueous electrolyte solution according to (1) above, the production apparatus including a liquid circulation pipe that returns a processed solution having a water content of less than 10 ppm by mass that is obtained after flowing the liquid to be processed from the original liquid tank through the ion-exchange resin container to the original liquid tank.

(3) A production method of a non-aqueous electrolyte solution, the production method including,
in a production apparatus of a non-aqueous electrolyte solution, the production apparatus including
an original liquid tank that stores a liquid to be processed containing a non-aqueous electrolyte solution, and an ion-exchange resin container that accommodates a weakly basic anion-exchange resin, and also including
a liquid circulation pipe that returns a liquid to be processed that is obtained after flowing the liquid to be processed from the original liquid tank through the ion-exchange resin container to the original liquid tank,
circulating the liquid to be processed while returning the processed solution that is obtained after flowing the liquid to be processed from the original liquid tank through the ion-exchange resin container to the original liquid tank.
(4) The production method of the non-aqueous electrolyte solution according to (3) above, in which after a processed solution having a water content of less than 10 ppm by mass is obtained by flowing the liquid to be processed from the original liquid tank through the ion-exchange resin container, the processed solution obtained is returned to the original liquid tank.

Advantageous Effects of Invention

According to the present invention, the non-aqueous electrolyte solution is produced by circulating the liquid to be processed while returning the processed solution that is obtained after flowing the liquid to be processed from the original liquid tank through the ion-exchange resin container (the liquid to be processed that has flowed therethrough) to the original liquid tank. Therefore, by controlling the amount or like of the liquid to be processed at the time of processing the liquid to be processed, the ion-exchange group can be fully utilized, so that not only the non-aqueous electrolyte solution having a constant quality can be obtained by readily controlling the acidic impurity concentration so as to be in a prescribed level regardless of whether the ion-exchange ability of the ion-exchange resin is decreased, but also the exchange interval of the ion-exchange resin can be readily prolonged.

Accordingly, the present invention can provide a production apparatus of a non-aqueous electrolyte solution and a production method of a non-aqueous electrolyte solution with which the non-aqueous electrolyte solution can be produced conveniently and at a low cost with easily controlling the acidic impurity concentration so as to be in a prescribed level.

DESCRIPTION OF EMBODIMENTS

Hereinafter, the production apparatus of the non-aqueous electrolyte solution according to the present invention shall be described with referring to the drawings as appropriate.

Figure 1:
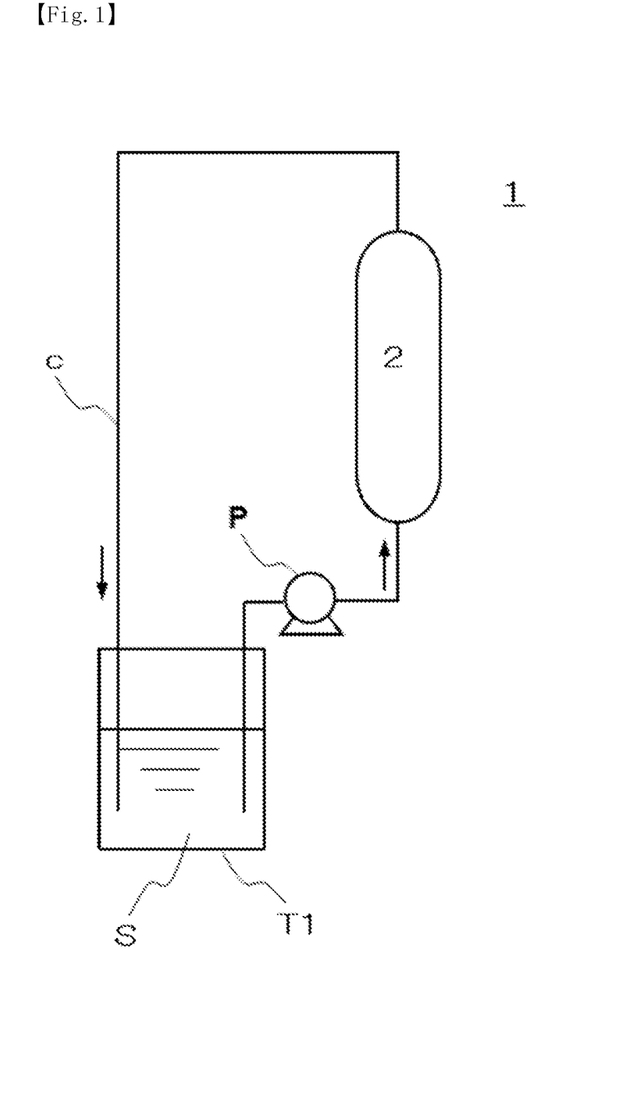
FIG. 1 is a schematic diagram illustrating an embodiment example of the production apparatus of the non-aqueous electrolyte solution according to the present invention.

FIG. 1 is a schematic diagram illustrating a constitution example of the production apparatus of the non-aqueous electrolyte solution according to the present invention.

As can be seen in FIG. 1, the production apparatus 1 of the non-aqueous electrolyte solution according to the present invention includes an original liquid tank T1 that stores a liquid to be processed S containing the non-aqueous electrolyte solution, an ion-exchange resin container 2 that accommodates a weakly basic anion-exchange resin, and a liquid circulation pipe c that returns a processed solution S that is obtained after flowing the liquid to be processed S from the original liquid tank T1 through the ion-exchange resin container 2 (the liquid to be processed that has flowed therethrough) to the original liquid tank T1.

In the production apparatus 1 of the non-aqueous electrolyte solution according to the present invention, the liquid to be processed S containing the non-aqueous electrolyte solution is stored in the original liquid tank T1.

The non-aqueous electrolyte solution that is stored in the original liquid tank is the solution having an alkali metal salt electrolyte dispersed in a non-aqueous solvent.

As for the non-aqueous solvent that constitutes the non-aqueous electrolyte solution, an organic non-aqueous solvent is preferable.

The organic non-aqueous solvent may be one or more solvents selected from ethylene carbonate, propylene carbonate, dimethyl carbonate, diethyl carbonate, methyl ethyl carbonate, fluoroethylene carbonate, methyl acetate, ethyl acetate, propyl acetate, butyl acetate, γ-butyrolactone, sulfolane, 1,2-dimethoxyethane, 1,2-dietoxiethane, 1,2-dibutoxyethane, ethoxymethoxyethane, and the like.

Illustrative examples of the alkali metal salt electrolyte that constitutes the non-aqueous electrolyte solution include a lithium-based electrolyte. The lithium-based electrolyte may be one or more salts selected from $LiPF_6$, $LiClO_4$, $LiBF_4$, $LiAsF_6$, $LiSbF_6$, $LiAlCl_4$, $LiCF_3SO_3$, $LiN(SO_2F)_2$, $LiN(SO_2CF_3)_2$, and the like. In view of the battery performance, $LiPF_6$ is preferable.

As for the non-aqueous electrolyte solution in the production apparatus of the non-aqueous electrolyte solution according to the present invention, the electrolyte solution for a lithium-ion battery is preferable.

In the production apparatus of the non-aqueous electrolyte solution according to the present invention, when the non-aqueous electrolyte solution in the liquid to be processed contains the lithium-based electrolyte, the concentration of the lithium-based electrolyte in the liquid to be processed is preferably 0.5 to 10.0 mol/L, and more preferably 0.5 to 5.0 mol/L, while still more preferably 0.8 to 2.0 mol/L.

In the document of the present application, the concentration of the lithium-based electrolyte in the liquid to be processed means the value obtained from the lithium metal concentration measured by an atomic absorption spectrophotometry using an atomic absorption spectrophotometer (Polarized Zeeman Atomic Absorption Spectrophotometer ZA3000, manufactured by Hitachi High-Tech Corp.).

In the production apparatus of the non-aqueous electrolyte solution according to the present invention, the original liquid tank that stores the liquid to be processed is preferably under an atmosphere of an inert gas, which may be one or more gases selected from a nitrogen gas, a helium gas, an argon gas, and the like.

As illustrated in FIG. 1, the production apparatus 1 of the non-aqueous electrolyte solution according to the present invention has an ion-exchange resin container 2 that accommodates a weakly basic anion-exchange resin.

As for the weakly basic anion-exchange resin that is used in the production apparatus of the non-aqueous electrolyte solution according to the present invention, any heretofore known anion-exchange resin may be used; among them, an ion-exchange resin based on an organic polymer resin compound type is preferable.

Illustrative examples of the ion-exchange resin based on the organic polymer resin compound type include those of the styrenic resin base body (mother body) such as a styrene-divinylbenzene copolymer and those of the acrylic resin base body such as a methacrylic acid-divinylbenzene copolymer and an acrylic acid-divinylbenzene copolymer.

In the document of the present application, the styrenic resin means the resin in which styrene or a styrene derivative is homopolymerized or copolymerized with the content of the constitution unit derived from the styrene or the styrene derivative being 50% or more by mass.

Illustrative examples of the styrene derivative include a-methylstyrene, vinyltoluene, chlorostyrene, ethylstyrene, i-propylstyrene, dimethylstyrene, and bromostyrene.

The styrenic resin may be a copolymer with other copolymerizable vinyl monomer as far as the homopolymer or the copolymer of the styrene or the styrene derivative is a main component therein. The vinyl monomer like this may be one or more monomers selected from divinylbenzenes such as o-divinylbenzene, m-divinylbenzene, and p-divinylbenzene; polyfunctional monomers such as alkyleneglycol di(meth)acrylates including ethyleneglycol di(meth)acrylate and polyethyleneglycol di(meth)acrylate; (meth)acrylonitrile; methyl (meth)acrylate; and the like.

As for the other copolymerizable vinyl monomer, ethyleneglycol di(meth)acrylate, a polyethyleneglycol di(meth) acrylate having the ethylene polymerization number of 4 to 16, and divinylbenzene are preferable, and divinylbenzene and ethyleneglycol di(meth)acrylate are more preferable, while divinylbenzene is still more preferable.

In the production apparatus of the non-aqueous electrolyte solution according to the present invention, the ion-exchange group that constitutes the weakly basic anion-exchange resin is a weakly basic anion-exchange group, preferably primary to tertiary amino groups, and more preferably a tertiary amino group.

Illustrative examples of the weakly basic ion-exchange group that constitutes the weakly basic anion-exchange resin include the tertiary amino group represented by the following general formula (I).

[Chem. 1]

(I)

(In the formula, the $R^1$ group and the $R^2$ group are hydrocarbon groups having carbon numbers of 1 to 3, in which they may be the same or different with each other; the symbol * indicates a bonding site with the base body or with a bonding group to be bonded to the base body.)

In the weakly basic anion-exchange group represented by the general formula (I), the $R^1$ group and the $R^2$ group are hydrocarbon groups having carbon numbers of 1 to 3.

The $R^1$ group or the $R^2$ group may be one or more groups selected from an alkyl group and an alkenyl group; among them, an alkyl group is preferable.

The $R^1$ group or the $R^2$ group may be, specifically, one or more groups selected from a methyl group, an ethyl group, a propyl group, and a propylene group; among them, a methyl group is preferable.

In the weakly basic anion-exchange group represented by the general formula (I), the $R^1$ group and the $R^2$ group may be the same or different with each other.

Illustrative examples of the weakly basic anion-exchange group represented by the general formula (I) include a dimethylamino group, a diethylamino group, and a dipropylamino group; among them, a dimethylamino group is preferable.

In the general formula (I), the symbol * indicates a bonding site of the weakly basic anion-exchange group represented by the general formula (I) with the base body or with a bonding group to be bonded to the base body.

It is preferable that the weakly basic anion-exchange group represented by the general formula (I) be, as appropriate, bonded to the base body formed of a styrenic resin via the $R^3$ group, which is the bonding group as indicated by the general formula (II).

[Chem. 2]

(II)

(In the formula, the $R^1$ group and the $R^2$ group are hydrocarbon groups having carbon numbers of 1 to 3, in which they may be the same or different with each other; the $R^3$ group is a hydrocarbon group having 1 to 3 carbon numbers; and the symbol * represents the bonding site with the base body.)

The $R^1$ group and the $R^2$ group may be the same as those mentioned before.

The $R^3$ group is a hydrocarbon group having 1 to 3 carbon numbers. The $R^3$ group may be one or more groups selected from an alkylene group and an alkenylene group; among them, an alkylene group is preferable.

The $R^3$ group may be, specifically, one or more groups selected from a methylene group (—$CH_2$—), an ethylene group (—$CH_2CH_2$—), a propylene group (—$CH_2CH_2CH_2$—), and the like; among them, a methylene group is preferable.

The weakly basic anion-exchange group represented by the general formula (I) may be introduced into the styrenic resin by introducing this group into the styrene or the styrene derivative as a substituent group.

The ion-exchange resin may be the one having a gel type structure, or a macroreticular type structure (MR type), or a macroporous type structure (MP type), or a porous type structure.

The weakly basic anion-exchange resin to be used in the present invention is preferably the one having a primary amine or a secondary amine as the ion-exchange group, the one having an amino group having a polyamine structure as the ion-exchange group, the one having the styrenic resin as the base body as well as a dimethyl amino group as the ion-exchange group, and the like. When these weakly basic anion-exchange resins are used, the content of the acidic impurities such as hydrogen fluoride can be readily reduced.

Although the size of the weakly basic anion-exchange resin is not particularly restricted, the harmonic mean diameter thereof is preferably in the range of 300 to 1,000 µm, and more preferably in the range of 400 to 800 µm, while still more preferably in the range of 500 to 700 µm.

In the weakly basic anion-exchange resin, the total ion-exchange capacity in the wet swollen state thereof is preferably 0.1 to 3.0 (eq/L-R), and more preferably 0.5 to 2.5 (eq/L-R), while still more preferably 1.0 to 2.0 (eq/L-R).

The weakly basic anion-exchange resin like this may be a commercially available product, and, for example, may be one or more resins selected from Diaion WA30 manufactured by Mitsubishi Chemical Corp., ORLITE DS-6 manufactured by Organo Corp., and the like.

In the production apparatus of the non-aqueous electrolyte solution according to the present invention, the accommodation embodiment of the weakly basic anion-exchange resin in the ion-exchange resin container is not particularly restricted as far as it is the embodiment in which the liquid to be processed and the weakly basic anion-exchange resin can contact with each other.

For example, the ion-exchange resin container may be a column or a tank packed with the weakly basic anion-exchange resin through which the liquid to be processed can flow.

It is preferable that the ion-exchange resin be dried under a reduced pressure with the temperature of about 40 to 100° C. and packed into a column.

In addition, the production apparatus 1 of the non-aqueous electrolyte solution according to the present invention may be the one having a pump P to flow the liquid to be processed S, as illustrated in FIG. 1. In FIG. 1, the pump P is installed between the original liquid tank T1 and the ion-exchange resin container 2 in the liquid circulation pipe c.

As described above, the non-aqueous electrolyte solution is preferably a solution from which the acidic impurities such as hydrogen fluoride are removed; but in addition to the acidic impurities, because water is also the impurity in the non-aqueous electrolyte solution, it is preferable that the water content in the weakly basic anion-exchange resin be reduced as low as possible.

Because of this, the weakly basic anion-exchange resin to be used in the production apparatus of the non-aqueous electrolyte solution according to the present invention is preferably the one having a water content reduced to a certain level by previously conducting a pretreatment as described below.

The weakly basic anion-exchange resin to be used in the production apparatus of the non-aqueous electrolyte solution according to the present invention is preferably the one that is treated in advance by the pretreatment apparatus described as follows. Namely, the ion-exchange resin is treated in advance by the pretreatment apparatus of the ion-exchange resin including at least a non-aqueous solvent tank that stores the non-aqueous solvent, the ion-exchange resin container that accommodates the ion-exchange resin, and a water-removal apparatus that removes the water in the non-aqueous solvent, as well as having at least one liquid transferring pipe selected from a non-aqueous solvent circulation pipe through which the non-aqueous solvent is flowed from the non-aqueous solvent tank to the ion-exchange resin container and to the water-removal apparatus in this order, and then the non-aqueous solvent thus flowed is returned back to the non-aqueous solvent tank, and a non-aqueous solvent circulation pipe through which the non-aqueous solvent is flowed from the non-aqueous solvent tank to the water-removal apparatus and to the ion-exchange resin container in this order, and then the non-aqueous solvent thus flowed is returned back to the non-aqueous solvent tank.

Figure 2:
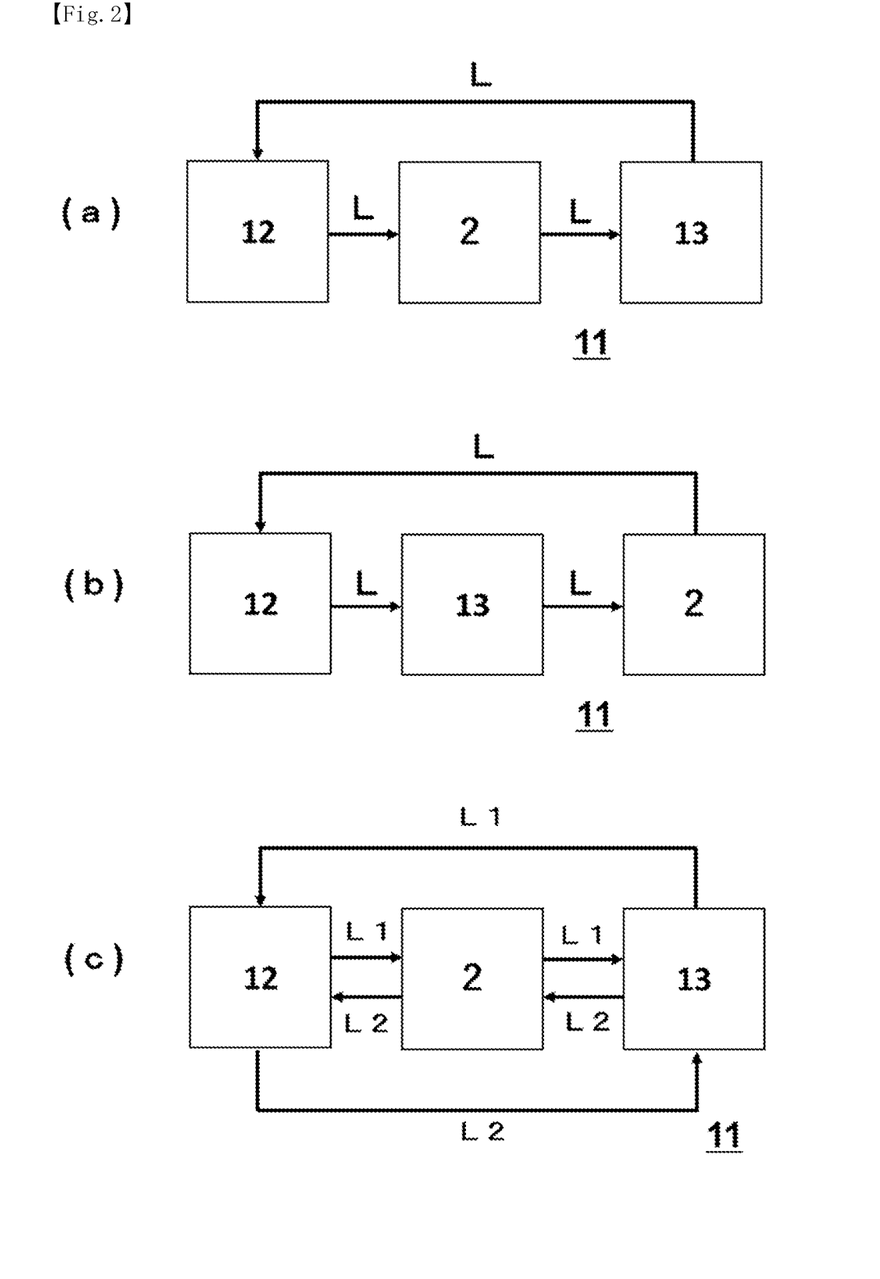
FIG. 2 includes schematic diagrams illustrating pretreatment methods of the ion-exchange resin.

FIG. 2 illustrates constitution examples of the pretreatment apparatus of the ion-exchange resin as described above.

In the examples illustrated in FIG. 2(a) to FIG. 2(c), a pretreatment apparatus 11 of the ion-exchange resin includes at least a non-aqueous solvent tank 12 that stores a non-aqueous solvent, the ion-exchange resin container 2 that accommodates the ion-exchange resin, and a water-removal apparatus 13 that removes water in the non-aqueous solvent.

The pretreatment apparatus 11 of the ion-exchange resin includes at least one liquid transferring pipe selected from a non-aqueous solvent circulation pipe L as illustrated in FIG. 2(a), through which the non-aqueous solvent is flowed from the non-aqueous solvent tank 12 to the ion-exchange resin container 2 and to the water-removal apparatus 13 in this order, and then the non-aqueous solvent thus flowed is returned back to the non-aqueous solvent tank 12, and a non-aqueous solvent circulation pipe L as described in FIG. 2(b), through which the non-aqueous solvent is flowed from the non-aqueous solvent tank 12 to the water-removal apparatus 13 and to the ion-exchange resin container 2 in this order, and then the non-aqueous solvent thus flowed is returned back to the non-aqueous solvent tank 12.

Also, as illustrated in FIG. 2(c), the pretreatment apparatus 11 of the ion-exchange resin may be the one that has a non-aqueous solvent circulation pipe L1 through which the non-aqueous solvent is flowed from the non-aqueous solvent tank 12 to the ion-exchange resin container 2 and to the water-removal apparatus 13 in this order, and then the non-aqueous solvent thus flowed is returned back to the non-aqueous solvent tank 12, as well as a non-aqueous solvent circulation pipe L2 through which the non-aqueous solvent is flowed from the non-aqueous solvent tank 12 to the water-removal apparatus 13 and to the ion-exchange resin container 2 in this order, and then the non-aqueous solvent thus flowed is returned back to the non-aqueous solvent tank 12.

In the embodiment illustrated in FIG. 2(c), at the time of flowing the non-aqueous solvent, when a valve installed in any one of the liquid transferring pipes, either the non-aqueous solvent circulation pipe L1 or the non-aqueous solvent circulation pipe L2, is closed, the non-aqueous solvent flows through the other liquid transferring pipe.

The pretreatment apparatus 11 of the ion-exchange resin may be the one having a pump (not illustrated in the drawing) to flow the non-aqueous solvent.

During the pretreatment time of the ion-exchange resin, it is preferable to flow the non-aqueous electrolyte solution through the ion-exchange resin in the ion-exchange resin container 2 with an upward flow (from the lower part to the upper part of the ion-exchange resin container 2).

Illustrative examples of the non-aqueous solvent that is flowed through the pretreatment apparatus of the ion-exchange resin include an organic non-aqueous solvent.

As for the non-aqueous solvent, preferable is the same solvent as the constitution solvent in the non-aqueous electrolyte solution that is flowed through the ion-exchange resin that has been pretreated by the pretreatment apparatus of the ion-exchange resin followed by installation thereof to the production apparatus of the non-aqueous electrolyte solution according to the present invention.

Specific examples of the non-aqueous solvent are the same as those that have already been described.

The ion-exchange resin that is accommodated in the ion-exchange resin container 2 incorporated into the pretreatment apparatus 11 of the ion-exchange resin is the same as the one that is used in the production apparatus of the non-aqueous electrolyte solution according to the present invention; and the specific examples the ion-exchange resin are the same as those that have already been described.

The ion-exchange resin container 2 that is incorporated into the pretreatment apparatus 11 of the ion-exchange resin may be the same as or different from the one that is used in the production apparatus of the non-aqueous electrolyte solution according to the present invention; and the specific examples of the ion-exchange resin container are the same as those that have already been described.

In order to conveniently and promptly conduct the production process of the non-aqueous electrolyte solution after the pretreatment, it is preferable that both the ion-exchange resin container and the ion-exchange resin that have been used at the time of the pretreatment be incorporated as they are into the production apparatus of the non-aqueous electrolyte solution.

Illustrative examples of the water-removal apparatus 13 include a water-adsorption apparatus, a membrane separation apparatus, and a gas-liquid separation apparatus; among them, a water-adsorption apparatus is preferable.

When the water-removal apparatus is the water-adsorption apparatus, it is preferable that the water-adsorption apparatus accommodate zeolite as the water-adsorption material.

There is no particular restriction in the zeolite that is accommodated in the water-adsorption apparatus as far as it can adsorb the water in the non-aqueous solvent; and the zeolite may be one or more zeolites selected from crystalline zeolites.

The crystalline zeolite may be one or more crystalline zeolites selected from A-type, Y-type, X-type, chabazite, ferrierite, ZSM-5, clinoptilolite, and the like.

In the pretreatment apparatus of the ion-exchange resin, there is no particular restriction in the accommodation embodiment of the zeolite that is accommodated in the water-adsorption apparatus as far as it is the embodiment in which the non-aqueous solvent and the zeolite can contact with each other. Therefore, for example, the water-adsorption apparatus may be a column or a tank in which the zeolite is packed such that the non-aqueous solvent may flow therethrough.

Also, the water-adsorption apparatus may be the one that is provided with a pump to flow the non-aqueous solvent therethrough.

In the pretreatment apparatus of the ion-exchange resin, the velocity (liquid space velocity) of the non-aqueous solvent through the ion-exchange resin container and the water-removal apparatus may be determined as appropriate from the velocity at which the water in the ion-exchange resin can be removed.

After completion of the pretreatment of the ion-exchange resin, it is preferable that the non-aqueous solvent having been used for the pretreatment be discharged from the lower part of the ion-exchange resin container 2 by pushing with an inert gas introduced from the upper part of the ion-exchange resin container 2.

In the pretreatment apparatus 11 of the ion-exchange resin, the non-aqueous solvent circulation pipes L, L1, and L2 are arranged such that the non-aqueous solvent in the non-aqueous solvent tank 12 can circulate through the ion-exchange resin container 2 and the water-removal apparatus 13. Therefore, pretreatment of the ion-exchange resin can be conducted with repeating the elution of the water that remains in the ion-exchange resin by the non-aqueous solvent and the adsorptive removal of the water that is eluted into the non-aqueous solvent by the water-removal apparatus. Accordingly, in the pretreatment apparatus of the ion-exchange resin, by only flowing a small amount of the non-aqueous solvent through the flow channel of the non-aqueous solvent circulation pipes, the water content in the ion-exchange resin can be reduced conveniently and economically.

In the production apparatus of the non-aqueous electrolyte solution according to the present invention, the pretreatment apparatus of the ion-exchange resin may be a separate body from the production apparatus of the non-aqueous electrolyte solution according to the present invention, or may be an integrated body in which the production apparatus of the non-aqueous electrolyte solution according to the present invention has the ion-exchange resin pretreatment unit having the pretreatment apparatus of the ion-exchange resin.

Figure 3:
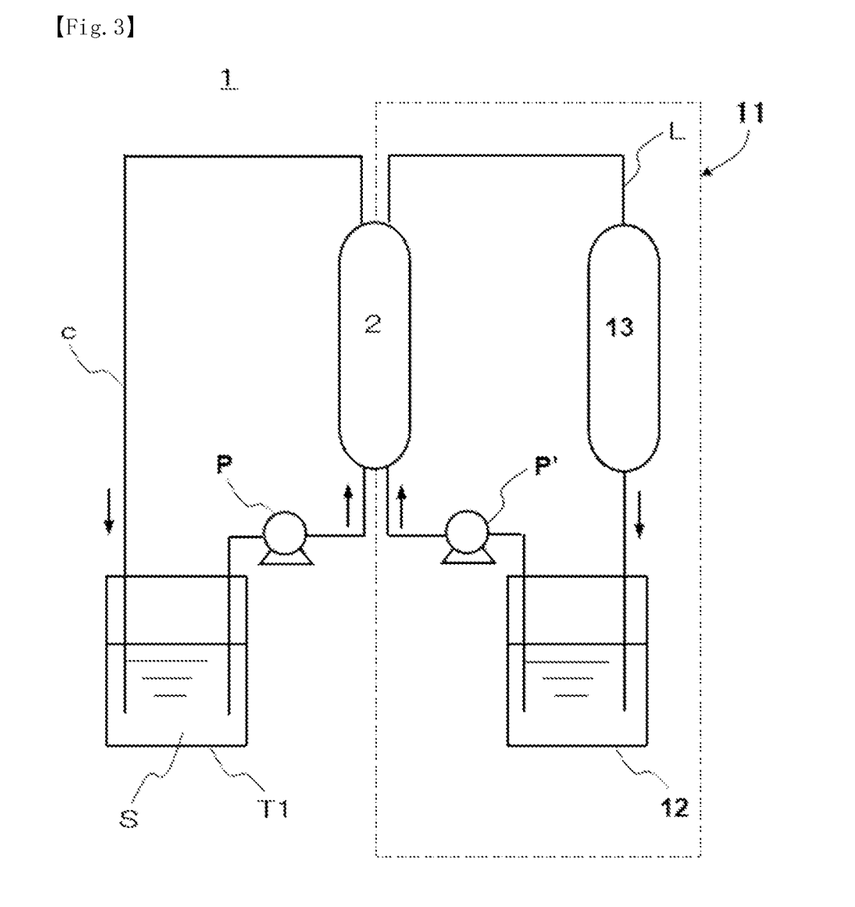
FIG. 3 is a schematic diagram illustrating an embodiment example of the production apparatus of the non-aqueous electrolyte solution according to the present invention.

FIG. 3 is a schematic diagram illustrating a constitution embodiment example of the production apparatus of the non-aqueous electrolyte solution according to the present invention. This illustrates the production apparatus 1 of the non-aqueous electrolyte solution that is provided with the ion-exchange resin pretreatment unit 11 having the pretreatment apparatus of the ion-exchange resin.

The ion-exchange resin pretreatment unit 11 that constitutes the production apparatus 1 of the non-aqueous electrolyte solution illustrated in FIG. 3 has the non-aqueous solvent circulation pipe L that returns the non-aqueous solvent to the non-aqueous solvent tank 12 after having flowed from the non-aqueous solvent tank 12 through the ion-exchange resin container 2 and the water-removal apparatus 13 in this order, as illustrated in the same drawing. A pump P' is installed between the non-aqueous solvent tank 12 and the ion-exchange resin container 2 in the non-aqueous solvent circulation pipe L.

In the embodiment illustrated in FIG. 3, at the time when the non-aqueous solvent is flowed, a valve (not illustrated in the drawing) that is installed in the liquid circulation pipe c is closed, and a valve (not illustrated in the drawing) that is installed in the non-aqueous solvent circulation pipe L is opened, whereby the ion-exchange resin can be pretreated by flowing the non-aqueous solvent through the ion-exchange resin container 2 with circulating by using the pump P'; then, when the pretreatment is over, the valve (not illustrated in the drawing) that is installed in the non-aqueous solvent circulation pipe L is closed, and the valve (not illustrated in the drawing) that is installed in the liquid circulation pipe c is opened, whereby the pretreatment of the ion-exchange resin and the production of the non-aqueous electrolyte solution can be continuously carried out in the ion-exchange resin container 2 by flowing the liquid to be processed S through the ion-exchange resin container 2 with circulating by using the pump P.

As illustrated in FIG. 1, in the production apparatus 1 of the non-aqueous electrolyte solution according to the present invention, the liquid to be processed S is caused to flow from the original liquid tank T1 to the ion-exchange resin container 2.

In the production apparatus of the non-aqueous electrolyte solution according to the present invention, the flowing velocity (liquid space velocity) of the liquid to be processed through the weakly basic anion-exchange resin in the ion-exchange resin container may be determined as appropriate from the velocity at which the acidic impurities in the liquid to be processed can be removed.

As illustrated in FIG. 1, in the production apparatus of the non-aqueous electrolyte solution according to the present invention, it is preferable to flow the liquid to be processed through the ion-exchange resin in the ion-exchange resin container 2 with an upward flow (from the lower part to the upper part of the ion-exchange resin container 2).

In the production apparatus of the non-aqueous electrolyte solution according to the present invention, at the time of transferring the liquid to be processed with circulation, it is preferable to previously flow the liquid to be processed (preferably after conducting the pretreatment of the ion-exchange resin) to the ion-exchange resin container in an upward flow direction (from the lower part to the upper part of the ion-exchange resin container) with the liquid space velocity SV (flow rate of the liquid to be processed/volume of the ion-exchange resin) of 1 to 20 $hr^{-1}$ with the discharge amount of 1 to 5 times of the flow BV (volume of the liquid to be processed/volume of the ion-exchange resin) for replacement.

It is preferable to conduct the replacement processing, for example, until the water content in the liquid to be processed that is discharged from the ion-exchange resin container reaches less than 10 ppm by mass; and when the processed solution that is discharged from the ion-exchange resin contains 10 ppm or more by mass of water in the early period of the replacement processing, it is preferable that the processed solution be discharged.

By conducting the replacement processing as described above, the liquid component that remains in the ion-exchange resin can be satisfactorily replaced with the liquid to be processed so that the decrease in the electrolyte concentration in the liquid to be processed during circulation operation can be suppressed.

In the production apparatus of the non-aqueous electrolyte solution according to the present invention, after the operation such as back-washing and pushing-out by a conventional method is conducted as appropriate to the ion-exchange resin container that has been subjected to the pretreatment and the replacement processing as appropriate, the liquid to be processed may be processed by flowing it with the liquid space velocity SV (flow rate of the liquid to be processed/volume of the ion-exchange resin) of preferably 10 to 1,000 $hr^{-1}$, and more preferably SV of 20 to 500 $hr^{-1}$, while still more preferably SV of 50 to 200 $hr^{-1}$.

In the production apparatus of the non-aqueous electrolyte solution according to the present invention, the time to flow the liquid to be processed (circulation operation time of the liquid to be processed) is preferably 1 to 24 hours, and more preferably in the range of 3 to 16 hours, while still more preferably in the range of 6 to 12 hours.

In the production apparatus of the electrolyte solution for a lithium-ion battery according to the present invention, the water content in the processed solution (acid-adsorbed processed solution) that is obtained from the ion-exchange resin container is preferably less than 10 ppm by mass; and the water content in the processed solution (acid-adsorbed processed solution) that is flowed from the original liquid tank to the ion-exchange resin container and then returned to the original liquid tank is preferably less than 10 ppm by mass from the starting time of the return.

Therefore, it is preferable that the processed solution having a water content of less than 10 ppm by mass be returned to the original liquid tank, the processed solution having been obtained by the replacement processing or the like in advance by flowing the liquid to be processed from the original liquid tank through the ion-exchange resin container.

If the water content in the processed solution is 10 ppm or more by mass, there is a risk of increase in the hydrogen fluoride concentration in the processed solution after completion of the processing because the water reacts with the electrolyte with passage of time.

In the document of the present application, the water content means the value measured by the Karl-Fisher method.

As illustrated in FIG. 1, the production apparatus 1 of the non-aqueous electrolyte solution according to the present invention has the liquid circulation pipe c with which the liquid to be processed S having flowed from the original liquid tank T1 through the ion-exchange resin container 2 is returned to the original liquid tank T1.

When the non-aqueous electrolyte solution is produced by using the production apparatus 1 of the non-aqueous electrolyte solution according to the present invention, the method is carried out by circulating, by using the liquid circulation pipe c, the liquid to be processed with returning the liquid to be processed S that has flowed from the original liquid tank T1 through the ion-exchange resin container 2 to the original liquid tank T1.

As described above, this operation is repeated while circulating the liquid to be processed S; thus, during this operation, by controlling the amount of the liquid to be processed S, or by controlling the amount of the ion-exchange resin that is packed in the ion-exchange resin container 2, the acidic impurity concentration in the non-aqueous electrolyte solution thereby obtained can be readily controlled so as to be in a prescribed level regardless of whether the ion-exchange ability of the ion-exchange resin is decreased. Accordingly, not only the non-aqueous electrolyte solution having a constant quality can be always supplied, but also the exchange interval of the ion-exchange resin can be readily prolonged.

In the production apparatus of the non-aqueous electrolyte solution according to the present invention, the circulation operation is carried out with confirming the acidic impurity concentration (for example, hydrogen fluoride concentration) in the processed solution in the original liquid tank; then, at the time when the acidic impurity concentration reaches a prescribed level, the circulation operation is stopped, for example, by stopping the pump. By so doing, the processing can be conveniently carried out without extra time while readily controlling the acidic impurity concentration so as to be in a prescribed level.

After the circulation operation is completed, it is preferable that the processed solution that remains in the ion-exchange resin container be pushed out from the ion-exchange resin container by an inert gas so as to be recovered into the original liquid tank.

In the production apparatus of the non-aqueous electrolyte solution according to the present invention, the content of the acidic impurities such as hydrogen fluoride in the processed solution (acid-adsorbed processed solution) that is obtained by circulating the liquid to be processed is, in terms of the mass equivalent to hydrogen fluoride, preferably 20 ppm or less by mass, and more preferably 10 ppm or less by mass, while still more preferably 5 ppm or less by mass.

In the document of the present application, the acidic impurity content means the value measured by the neutralization titration method.

In the production apparatus of the non-aqueous electrolyte solution according to the present invention, as the target non-aqueous electrolyte solution, the processed solution (acid-adsorbed processed solution) obtained by circulating through the ion-exchange resin container may be used as it is or after having been purified as appropriate with a heretofore known method.

Illustrative examples of the non-aqueous electrolyte solution include the electrolyte solution selected from the electrolyte solution for a lithium-ion battery, the electrolyte solution for a sodium-ion battery, the electrolyte solution for a potassium-ion battery, and the like.

In the production apparatus of the non-aqueous electrolyte solution according to the present invention, the liquid to be processed that is obtained after flowing the liquid to be processed from the original liquid tank through the ion-exchange resin container is returned to the original liquid tank while circulating the liquid to be processed. Accordingly, the non-aqueous electrolyte solution can be produced conveniently and at a low cost with easily controlling the acidic impurity concentration so as to be in a prescribed level.

Next, the production method of the non-aqueous electrolyte solution according to the present invention will be described.

The production method of the non-aqueous electrolyte solution according to the present invention is characterized in that the production method includes, in a production apparatus of a non-aqueous electrolyte solution, the production apparatus including
an original liquid tank that stores a liquid to be processed containing a non-aqueous electrolyte solution, and an ion-exchange resin container that accommodates a weakly basic anion-exchange resin, and also including
a liquid circulation pipe that returns a liquid to be processed that is obtained after flowing the liquid to be processed from the original liquid tank through the ion-exchange resin container to the original liquid tank,
circulating the liquid to be processed while returning the liquid to be processed that is obtained after flowing the liquid to be processed from the original liquid tank through the ion-exchange resin container to the original liquid tank.

The production method of the non-aqueous electrolyte solution according to the present invention is substantially to produce the non-aqueous electrolyte solution by using the production apparatus according to the present invention. Therefore, details of the production method of the non-aqueous electrolyte solution according to the present invention is common with the explanation of the use embodiment of the production apparatus of the non-aqueous electrolyte solution according to the present invention that was described above.

According to the present invention, the non-aqueous electrolyte solution is produced in such a way that by circulating the liquid to be processed, the processed solution that is obtained after flowing the liquid to be processed from the original liquid tank through the ion-exchange resin container (the liquid to be processed that has flowed therethrough) is returned to the original liquid tank. Therefore, by controlling the amount or like of the liquid to be processed at the time of processing the liquid to be processed, the ion-exchange group can be fully utilized, so that not only the non-aqueous electrolyte solution having a constant quality can be obtained by readily controlling the acidic impurity concentration so as to be in a prescribed level regardless of whether the ion-exchange ability of the ion-exchange resin is decreased, but also the exchange interval of the ion-exchange resin can be readily prolonged.

Accordingly, the present invention can provide the production method of the non-aqueous electrolyte solution with which the non-aqueous electrolyte solution can be produced conveniently and at a low cost with easily controlling the acidic impurity concentration so as to be in a prescribed level.

EXAMPLES

Next, the present invention will be described more specifically by means of Examples; but these are mere examples so that these shall not restrict the present invention.

Example 1

By using the production apparatus 1 of the non-aqueous electrolyte solution illustrated in FIG. 1, the electrolyte solution for a lithium-ion battery was prepared.

Namely, first, as illustrated in FIG. 1, in the production apparatus of the non-aqueous electrolyte solution (production apparatus of the electrolyte solution for a lithium-ion battery) 1, as the weakly basic anion-exchange resin, a weakly basic anion-exchange resin of the macroreticular type (MR type), which has a styrene-divinylbenzene as the base body and a dimethylamino group as the weakly basic anion-exchange group, was accommodated in the column, i.e., the ion-exchange resin container 2.

As the liquid to be processed S, 0.7 kg (0.54 L) of the liquid to be processed, which was stored in the original tank T1, having hydrogen fluoride and $LiPF_6$ dissolved with the concentration of 100 ppm by mass and 1 mol/L, respectively, in the mixed solvent of ethylene carbonate (EC) and dimethyl carbonate (DMC) with the mixing ratio of 1:1 by volume, was flowed through 5 mL of the ion-exchange resin in the ion-exchange resin container 2 at the flow rate of SV 320 $hr^{-1}$ for 6 hours with circulating by using the pump P to obtain the processed solution (electrolyte solution).

The hydrogen fluoride concentration and the water content in the processed solution thereby obtained were measured. The results thereof are listed in Table 1.

Example 2

The same operation as Example 1, except that the volume of the liquid to be processed S stored in the original liquid tank 1 was changed from 0.7 kg (0.54 L) to 0.9 kg (0.69 L), was repeated to obtain the target processed solution (electrolyte solution).

The hydrogen fluoride concentration and the water content in the processed solution thereby obtained were measured. The results thereof are listed in Table 1.

Comparative Example 1

By using the production apparatus of the non-aqueous electrolyte solution illustrated in FIG. 4, the electrolyte solution for a lithium-ion battery was prepared.

In the production apparatus of the non-aqueous electrolyte solution (production apparatus of the electrolyte solution for a lithium-ion battery) that is illustrated in FIG. 4, as the weakly basic anion-exchange resin, the ion-exchange resin that is the same as the one used in Example 1 was accommodated in the column, i.e., the ion-exchange resin container 2.

As the liquid to be processed S, 0.7 kg (0.54 L) of the liquid to be processed, which is the same as the one used in Example 1, stored in the original liquid tank T1 was flowed with the flow rate of SV 40 $hr^{-1}$ by using the pump P, and the processed solution flowed out from the ion-exchange resin container 2 was stored in the storage tank T2.

The hydrogen fluoride concentration and the water content in the processed solution thereby obtained were measured. The results thereof are listed in Table 1.

Comparative Example 2

The same operation as Comparative Example 1, except that the volume of the liquid to be processed S stored in the original liquid tank 1 was changed from 0.7 kg (0.54 L) to 0.9 kg (0.69 L), was repeated to obtain the target processed solution (electrolyte solution).

The hydrogen fluoride concentration and the water content in the processed solution thereby obtained were measured. The results thereof are listed in Table 1.

TABLE 1

| Item | Example 1 | Example 2 | Comparative Example 1 | Comparative Example 2 |
|---|---|---|---|---|
| Flow type | Circulation | Circulation | Non-circulation | Non-circulation |
| Original liquid amount (kg) | 0.7 | 0.9 | 0.7 | 0.9 |
| HF concentration in liquid to be processed (ppm by mass) | 100 | 100 | 100 | 100 |
| HF concentration in processed solution (ppm by mass) | 10 | 20 | 20 | 30 |
| Water content in liquid to be processed (ppm by mass) | <10* | <10* | <10* | <10* |
| Water content in processed solution (ppm by mass) | <10* | <10* | <10* | <10* |

*In Table, "<10" means less than 10 ppm by mass.

From Table 1, in Example 1 and Example 2, by controlling the original liquid amount, the processed solutions with arbitrary HF concentrations could be obtained. From these results, it can be seen that according to the present invention, the acidic impurity concentration can be readily controlled so as to be in a prescribed level.

Also, from Table 1, it can be seen that in Comparative Example 1 and Comparative Example 2, only the processed solutions having higher HF concentrations could be obtained in spite that the same amounts of the original liquids as Example 1 and Example 2, respectively, were used.

INDUSTRIAL APPLICABILITY

According to the present invention, the production apparatus of the non-aqueous electrolyte solution and the production method of the non-aqueous electrolyte solution, with which the non-aqueous electrolyte solution can be produced conveniently and at a low cost with easily controlling the acidic impurity concentration so as to be in a prescribed level can be provided.

REFERENCE SIGNS LIST

1 Production apparatus of non-aqueous electrolyte solution
2 Ion-exchange resin container
11 Pretreatment apparatus
12 Non-aqueous solvent tank
13 Water-removal apparatus
S Liquid to be processed
L, L1, L2 Non-aqueous solvent circulation pipe
T1 Original liquid tank
T2 Storage tank
c Circulation pipe
P, P' Pump

The invention claimed is:

1. A production method of a non-aqueous electrolyte solution, the production method comprising:
   in a production apparatus of a non-aqueous electrolyte solution, the production apparatus comprising:
      an original liquid tank that stores a liquid to be processed comprising a non-aqueous electrolyte solution, and an ion-exchange resin container that comprises a weakly basic anion-exchange resin, and
      a liquid circulation pipe that returns a liquid to be processed that is obtained after flowing the liquid to be processed from the original liquid tank through the ion-exchange resin container to the original liquid tank, circulating the liquid to be processed while returning the liquid to be processed that is obtained after flowing the liquid to be processed from the original liquid tank through the ion-exchange resin container to the original liquid tank; and
   prior to when the liquid to be treated is processed with circulation through the ion exchange resin container containing the weakly basic anion-exchange resin, performing a replacement treatment in advance, the replacement treatment comprising passing the liquid to be treated from a lower part of the ion-exchange resin container to an upper part of the ion-exchange resin container at a liquid space velocity (SV):
   SV=((flow rate of the liquid to be processed)/(volume of the ion-exchange resin)) of 1 to 20 $hr^{-1}$ with the discharge amount of 1 to 5 times of the flow (BV):
   BV=((volume of the liquid to be processed)/(volume of the ion-exchange resin)).

2. The production method of the non-aqueous electrolyte solution according to claim 1, wherein after a processed solution having a water content of less than 10 ppm by mass is obtained by flowing the liquid to be processed from the original liquid tank through the ion-exchange resin container, the processed solution obtained is returned to the original liquid tank.

* * * * *